United States Patent
Bartholomew et al.

(10) Patent No.: US 9,160,392 B2
(45) Date of Patent: Oct. 13, 2015

(54) ROTARY KNOB WITH INTEGRATED ANTENNA

(71) Applicant: HARRIS CORPORATION, Melbourne, FL (US)

(72) Inventors: Scott E. Bartholomew, Webster, NY (US); Christopher D. Mackey, Spencerport, NY (US); Malcolm Packer, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 74 days.

(21) Appl. No.: 14/162,264

(22) Filed: Jan. 23, 2014

(65) Prior Publication Data

US 2015/0207206 A1    Jul. 23, 2015

(51) Int. Cl.
| | |
|---|---|
| *H01Q 1/00* | (2006.01) |
| *H04B 1/3827* | (2015.01) |
| *H01Q 1/08* | (2006.01) |
| *H04M 1/02* | (2006.01) |
| *H01Q 1/24* | (2006.01) |
| *H01Q 1/44* | (2006.01) |

(52) U.S. Cl.
CPC ............. *H04B 1/3833* (2013.01); *H01Q 1/08* (2013.01); *H01Q 1/242* (2013.01); *H01Q 1/244* (2013.01); *H01Q 1/44* (2013.01); *H04M 1/02* (2013.01)

(58) Field of Classification Search
USPC ............. 455/550, 550.1, 575.1, 348, 575.7, 455/173.1; 343/702, 878, 906, 901, 872, 343/760, 766, 749
See application file for complete search history.

(56) References Cited

U.S. PATENT DOCUMENTS

| | | | | | |
|---|---|---|---|---|---|
| 3,858,129 | A | * | 12/1974 | Ashida et al. | .............. 334/78 |
| 4,742,360 | A | * | 5/1988 | Carolus et al. | ............. 343/903 |
| 5,177,492 | A | * | 1/1993 | Tomura et al. | ............. 343/702 |
| 5,276,454 | A | * | 1/1994 | Gonzalez et al. | ........... 343/702 |
| 5,278,570 | A | | 1/1994 | Jaramillo et al. | |
| 5,426,440 | A | | 6/1995 | Shimada et al. | |

(Continued)

FOREIGN PATENT DOCUMENTS

WO      2014/008125      1/2014

OTHER PUBLICATIONS

Information about Related Patents and Patent Applications, see section 6 of the accompanying Information Disclosure Letter, which concerns Related Patents and Patent Applications.

(Continued)

*Primary Examiner* — Ganiyu A Hanidu
(74) *Attorney, Agent, or Firm* — Robert J. Sacco, Esq.; Fox Rothschild LLP (57) ABSTRACT

Control for a portable communication device (300) includes a control knob (304) which has an outer shell (610, 610*a*) at least partially formed of a dielectric material. The control knob is sized and shaped to facilitate fingertip control of the portable communication device, and has an integrated antenna (608, 608*a*) disposed within the outer shell. An axial member (612, 708) is provided on which the outer dielectric shell and the antenna are mounted to facilitate rotation of the control knob. A control device (606, 606*a*) is provided which is configured to control at least one electronic circuit (806) of a portable communication device responsive to a user rotation of the outer dielectric shell. The integrated antenna (608, 608*a*) is arranged to interface to at least one radio frequency communication circuit of a portable communication device.

23 Claims, 5 Drawing Sheets

(56) References Cited

U.S. PATENT DOCUMENTS

| | | | |
|---|---|---|---|
| 5,551,080 A | * | 8/1996 | Chambers et al. ............ 455/348 |
| 5,572,224 A | * | 11/1996 | Moller et al. ................. 343/702 |
| 5,983,119 A | * | 11/1999 | Martin et al. ............. 455/575.7 |
| 6,660,947 B1 | | 12/2003 | Badescu |
| 6,753,818 B2 | | 6/2004 | Wang |
| 7,116,937 B2 | | 10/2006 | Kinzler |
| 7,253,778 B1 | | 8/2007 | Bingle et al. |
| 7,994,987 B2 | | 8/2011 | Berezin et al. |
| 2001/0044320 A1 | * | 11/2001 | Ono et al. .................... 455/550 |
| 2004/0012531 A1 | | 1/2004 | Toda |
| 2004/0027297 A1 | * | 2/2004 | Chang ........................... 343/702 |
| 2005/0179613 A1 | | 8/2005 | Minoura |

OTHER PUBLICATIONS

International Search Report mailed Nov. 25, 2013 in International Application No. PCT/US2013/063256.

International Preliminary Report on Patentabilty for Application No. PCT/US2013/063256 mailed on Apr. 16, 2015.

\* cited by examiner

ROTARY KNOB WITH INTEGRATED ANTENNA

BACKGROUND OF THE INVENTION

1. Statement of the Technical Field

The inventive arrangements relate to portable electronic devices and more particularly to external control used in portable communication devices.

2. Description of the Related Art

Figure 1:
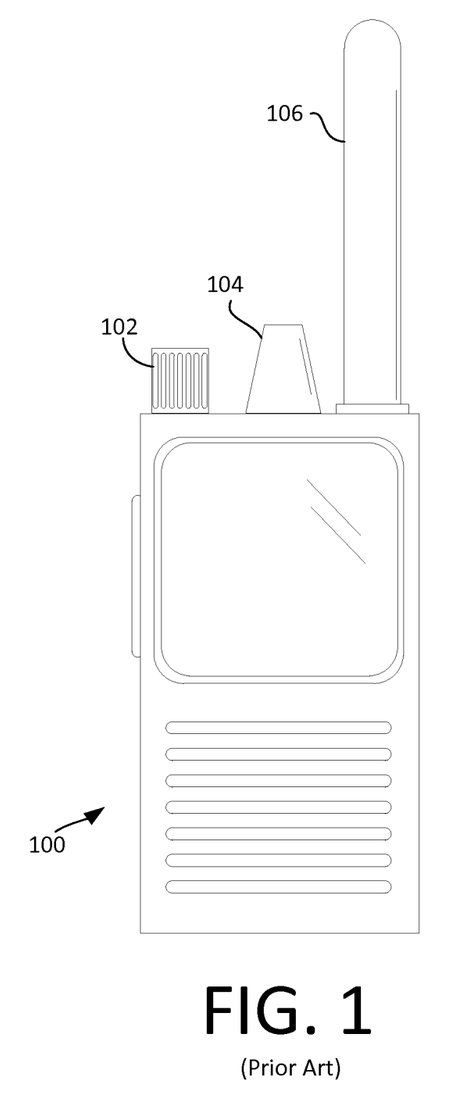
FIG. 1 is a front view of a conventional portable communication device.
Figure 2:
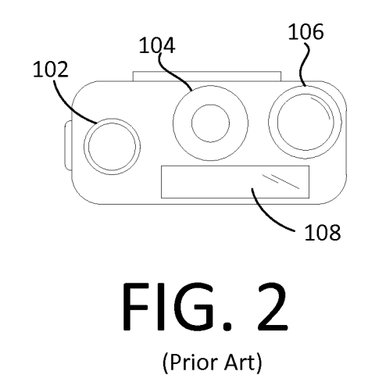
FIG. 2 is a top view of the conventional portable communication device shown in FIG. 1.

The top panel of a portable communication device (e.g., a portable radio) is very valuable for the reasons of accessibility and advantageous antenna positioning. Most portable communication devices have a primary antenna, a secondary antenna, external controls and a display screen. The external components often include buttons, knobs, antenna connectors, cable connectors and a keypad. At least some of the components of the external control are disposed on the top panel of the portable communication device. Similarly, the antennas have conventionally been disposed on the top panel of the portable communication device so as to protrude out and away therefrom. For example, FIG. 1 shows an exemplary portable communication device 100 which includes a control knob 102, a primary antenna 106 and a secondary antenna 104. Each of these components is disposed on a top panel 108 of the portable communication device. These components sometimes must compete for space with an auxiliary display 108 disposed on the top panel of the portable communication device However, there is great demand for small and unobtrusive portable communication devices. This demand has pushed some manufacturers to relocate one or more of the antennas from the outside of the chassis to the inside the chassis. While this improves the form factor of the portable communication devices, chassis-embedded antennas suffer degraded performance and higher susceptibility to surrounding electronics, board material, and human hands. Embedding the antennas also requires that the chassis be made out of non-metallic material, thus resulting in compromised ElectroMagnetic Interference ("EMI") and loss of structural ruggedness. For this reason, very few high performance portable communication devices have chassis-embedded antennas. Instead, most high performance communication devices have antennas protruding out and away from the top panel of the chassis, as described above. In order to keep up with the demand for portable communication devices with smaller form factor and less intrusive antennas, there needs to be a way to optimize the top panels of the communication devices.

SUMMARY OF THE INVENTION

According to one aspect, the invention concerns a portable communication device. The portable communication device includes a housing and a radio frequency communication circuit disposed in the housing. The radio frequency communication circuit comprised of one or more of a radio receiver circuit, a radio transmitter circuit or a radio transceiver circuit. A control knob is provided external of the housing and at least one control device is provided that is responsive to movement of the control knob relative to the housing. The movement of the control knob thus facilitates control of a least one function of the portable communication device by a user. An antenna for the radio frequency communication circuit is embedded within the control knob such that the antenna moves with the control knob when the control knob is moved relative to the housing. The combination of the control knob and antenna relieves congestion on the top of the radio, while providing full functionality.

According to another aspect, the invention concerns a control for a portable communication device. The control includes a control knob which has an outer shell at least partially formed of a dielectric material. The control knob is ergonomically sized and shaped to facilitate fingertip control of a portable communication device, and an antenna is disposed within the outer shell. An axial member is provided on which the ergonomic outer shell and the antenna are rotatably mounted. A control device is provided which is configured to control at least one electronic circuit of a portable communication device responsive to a user rotation of the outer shell and the antenna on the axial member.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Embodiments of the present invention will now be described with respect to FIGS. 3-8. Embodiments of the present invention generally relate to systems and methods for freeing up valuable space on a top panel of a portable communication device. The reclaimed space of the top panel allows: the form factor of the portable communication device to be decreased; and/or the disposition of additional external controls on the top panel. Such additional external controls include, but are not limited to, a relatively small display screen, a connector, a Light Emitting Diode ("LED"), a button, and/or a knob. The reclaimed space is obtained by embedding a secondary antenna inside a control knob disposed on the top panel of the portable communication device. By embedding the secondary antenna in the control knob, the secondary antenna capability is concealed without paying a performance penalty. In some embodiments, the secondary antenna is a Global Positioning System ("GPS") antenna or a Global Navigation Satellite System ("GNSS") antenna. GPS and GNSS antennas are well known in the art, and therefore will not be described herein. Those skilled in the art will appreciate that the secondary antenna can also comprise other antenna types. For example, the secondary antenna can also bee used for Bluetooth networks, local area networks, wide area networks without limitation.

Figure 3:
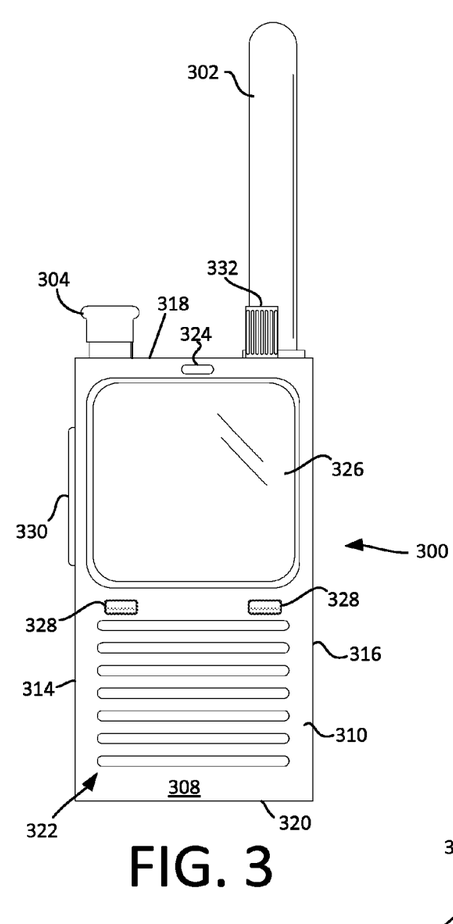
FIG. 3 is a front view of an exemplary portable communication device that is useful for understanding the present invention.
Figure 4:
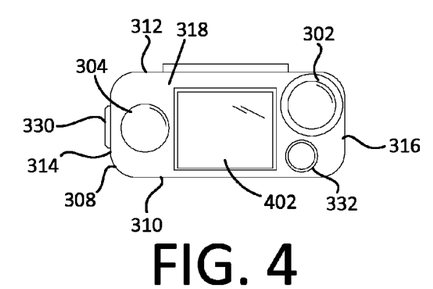
FIG. 4 is a top view of the exemplary portable communication device shown in FIG. 3.

Referring now to FIGS. 3 and 4, there provided a front and a top view, respectively, of an exemplary portable communication device 300 that is useful for understanding the present invention. Although the portable communication device 300 is shown in FIGS. 3 and 4 to be a portable land mobile (LMR) radio, the invention is not limited in this regard. For example, the portable communication device 300 can be a mobile telephone, a cellular telephone, an MP3 player, a personal computer, a PDA, a game pad, a GPS device or any other portable electronic device capable of communicating with other remotely located communication devices. A common configuration for a portable communication device includes a housing 308 which is generally in the form of a rectangular prism. For example, many land mobile radio (LMR) devices have this basic configuration which includes several major surfaces. The surfaces generally include opposing front and back panels 310, 312, opposing top and bottom panels 318, 320, and opposing first and second side panels 314, 316 which extend between the front and back panels. The front and back panels are generally the largest of the major panels comprising the housing of the portable communication device. Conversely, the top and bottom panels are usually the smallest of the major surfaces.

The front panel 310 is arranged to facilitate convenient and effective operation of the portable communication device when the back panel 312 rests within the palm of a user's hand. As such, the front panel commonly includes a speaker grille 322 to accommodate output audio from a speaker disposed within the housing subjacent to the grille. The speaker grille facilitates listening to communications received by the portable communication device. A microphone port 324 can also reside at the front panel so that audio information (speech) originating with the user is effectively provided to a microphone within the housing. The front panel can also include an electronic display unit 326 which is intended to facilitate the presentation of information to a user concerning the operational status of the portable communication device. The position of the display unit on the front panel is advantageous because the front panel is generally unobstructed and within the user's line of sight when the back panel of the unit rests within the palm of a user's hand. In some portable communication devices, one or more control keys 328 are also provided on the front panel to facilitate control of various communication device functions. A push-to-talk (PTT) button 330 is commonly provided on a side panel 314 of the device.

The top panel 318 of the portable communication device extends from an upper peripheral edge of the front panel to an upper peripheral edge of the back panel. The top panel also extends between an upper peripheral edge of the first and second side panels 314, 316. As such, the top panel is generally transverse to the front, back and side panels. From a design perspective, the top panel is considered to be of particular importance. One reason for its importance is that a rotary control knob 304 extending from the top panel is easily accessed and manipulated by a user when the portable communication device resides in a holster secured to the user's body. Also, in a portable communication device, the top panel serves as a preferred mounting location for one or more antennas utilized by the portable communication device.

The portable communication device 300 includes one or more antennas. At least one of the antennas is provided in the control knob 304. The portable communication device can also optionally include an antenna 302. The antenna 302 includes, but is not limited to, a Radio Frequency ("RF") antenna that may be used for any communication purpose, such as for voice and data communications. The antenna within the control knob can also be used for any purpose, such as voice and/or data communications. At least one of the antennas may be a GPS antenna or a GNSS antenna. Antenna 302 can be omitted in certain portable communication devices when only one antenna is needed. Notably, the rotary control knob 304 and antenna 302 (if present) are both located on a top panel 318 of the portable communication device 300. This location ensures that the antenna 302 (and the antenna within the control knob) will extend out and away from a user's body when the device is held in the user's hand; and allows access to the control knob 304 when the portable communication device 300 is being worn by the user (e.g., when the portable communication device 300 is disposed in a holster or mounted on a belt). The manner in which an antenna is embedded within the control knob 304 will become evident as the discussion progresses.

As a result of the antenna embedment within control knob 304, valuable space is made available on a top panel 318 of a portable communication device 300. The reclaimed space can allow for a larger auxiliary display screen 402 as shown.

Alternatively, the form factor of the portable communication device 300 can be decreased; and/or additional external controls (e.g. control 332 can be disposed) on the top panel 318. Such additional external controls can also include, but are not limited to, a connector, an LED, and/or a control key. The additional space can also be utilized for other components such as a data port and/or an audio jack.

The housing 308 is configured to house various internal components, including a battery which serves as a primary source of power for the portable communication device. The internal components also include, but are not limited to, internal circuitry for communicating signals to and from remotely located devices via the antenna 302 and/or the antenna which is disposed within the control knob. More particularly, the internal components can comprise a receiver and/or a transmitter, which may in combination be configured as a transceiver. In this regard, the internal circuitry is electrically connected to an antenna connector. For example, the internal circuitry can be electrically connected to the antenna 302. Additionally or alternatively, one or more internal circuits (e.g. receiver circuits, transmitter circuits and/or transceiver circuits) is electrically connected to the antenna within the control knob as described herein. Further the rotary control knob 304 in which the antenna is disposed can be arranged to control one or more functions of the portable communication device. Other external controls (e.g., a display screen, buttons, light emitting diodes, and/or connector) of the portable communication device 300 may be connected to the same or different circuitry contained in the portable communication device. For example, one or more of such external controls can be electrically connected to circuits for controlling a microprocessor contained within the portable communication device 300.

Housing 308 can be formed from a conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components of the portable communication device 300 are protected from damage due to external factors. Certain military standards require the housing to be formed of metal, which generally has conductive properties. As a practical matter, this means that any antennas must be external of the housing 308. The control knob 304, and the top panel 318 can be formed at least partially of a material that can withstand high temperatures and/or harsh environmental conditions. In addition, control knob 304 is made of a material that will not significantly degrade performance of the antenna contained therein. In this regard, an outer shell forming the control knob 304 should have little or no metal content so as to prevent any negative impact on antenna performance or antenna radiation pattern. In some embodiments, control knob 304 is constructed at least partially of a dielectric material so that it has very little or no effect on antenna performance. As an example, the dielectric material can be formed of a synthetic polymer such as polyoxymethylene which is sold under the trade name Delrin™. Still, the invention is not limited in this regard and other suitable dielectric materials can also be used.

According to another aspect of the invention, the dielectric material used for the control knob 304 can be advantageously selected to permit the dimensions of the antenna contained therein to be physically shortened. A conductor having a particular electrical length (e.g. ¼ wavelength) can be made physically shorter by disposing the conductor within a dielectric material having a permittivity greater than that of air. The dielectric permittivity of the control knob can therefore be selected to allow an antenna having a desired electrical length or width to fit within a knob having particular dimensions. The dielectric permittivity selected for this purpose can be affected by several factors such as the thickness of the control knob and its distance from the antenna. Accordingly, it is preferred that the particular combination of dielectric material permittivity and control knob dimensions be determined with computer modeling. By disposing the antenna within a control knob having a relatively high dielectric permittivity, a physically short monopole antenna with a relatively longer electrical length can be provided. A particular advantage of this arrangement is that the control knob serves a dual purpose. It functions as a control knob but also serves as a functional part of the antenna, thereby reducing size and weight.

Figure 5:
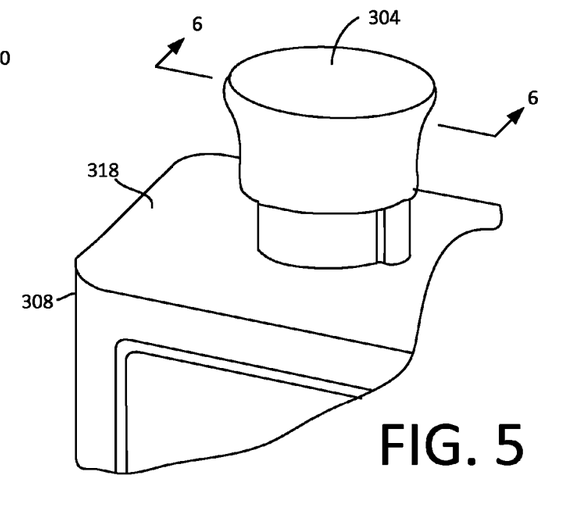
FIG. 5 is an enlarged perspective view of a control of the portable communication device shown in FIGS. 3-4.
Figure 6:
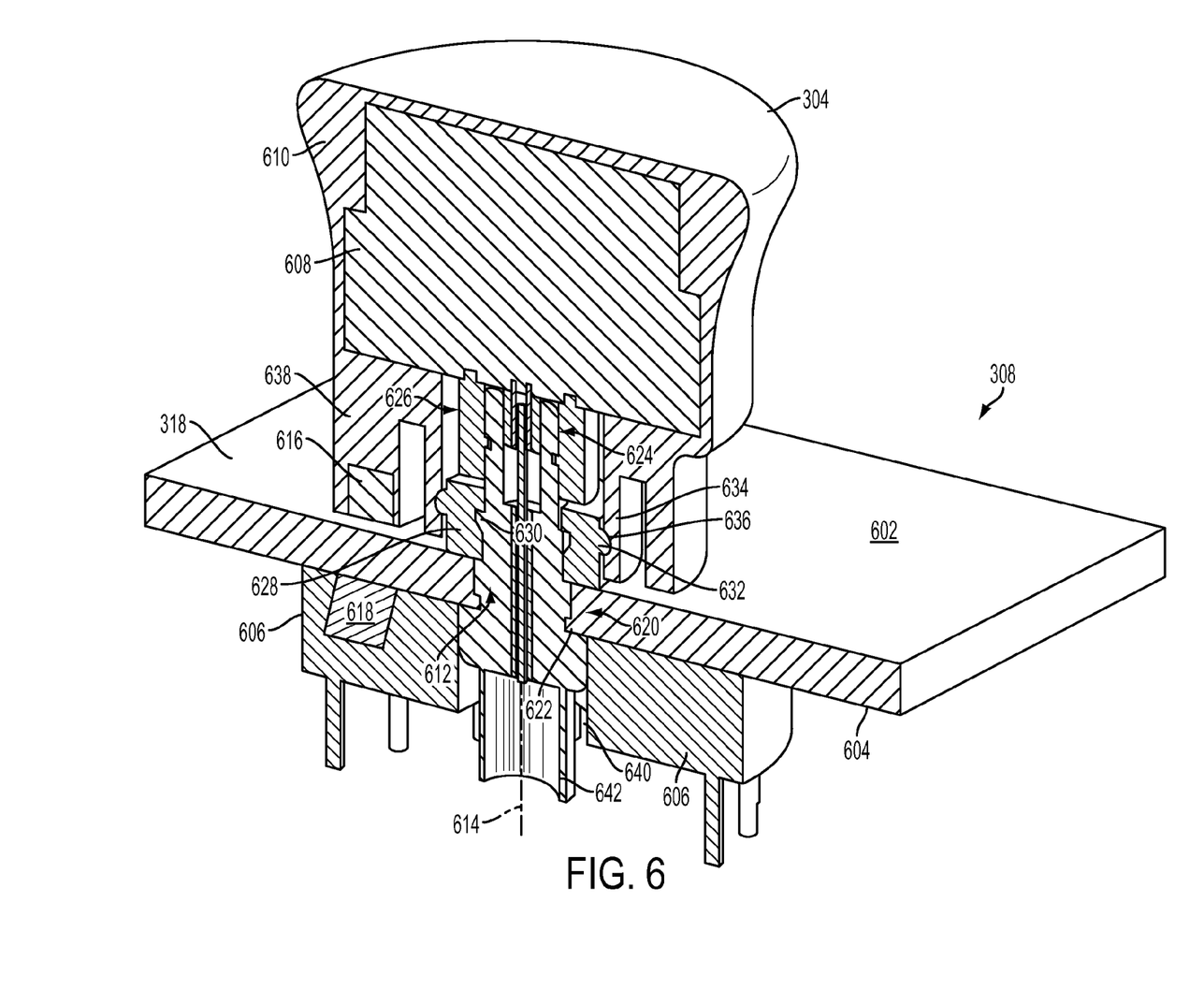
FIG. 6 is a perspective view of the control in FIG. 5 cut-away along line 6-6 to show the internal components of the control knob.

Referring now to FIG. 5 there is shown an enlarged perspective view of control knob 304. A cut-away view of the knob, taken along line 6-6, is shown in FIG. 6. As shown in these figures, the control knob 304 is disposed on an external side 602 of top panel 318, which side is external of the housing 308. Also shown in FIG. 6 is a control device 606 which, in the embodiment shown, is disposed at an internal side 604 of the housing 308 (internal to the housing). An antenna 608 is disposed within the control knob. The antenna 608 is secured within the control knob so that the antenna will rotate with the control knob when the control knob is rotated relative to the housing. For example, the control knob 304 can be a molded part formed of a polymer material, and the antenna in such a scenario can be press-fit, snap fit, or molded within the polymer material during the molding process. Other embodiments are also possible. For example, the antenna 608 could be secured within the outer shell 610 of the control knob by means of an adhesive or mechanical fastener arrangement (not shown). Other suitable arrangements can also be used to secure the antenna within the control knob. If the outer shell 610 has been over-molded around the exterior of the antenna 608, then the antenna can be said to be potted within the polymer material forming the outer shell.

Regardless of the particular arrangement used to secure the antenna, the outer shell 610 is advantageously shaped and sized to conveniently facilitate fingertip rotational control of the knob by a user. As such the outer shell will have an ergonomic shape which is suitable for gripping. For example, the shell may have a tapered cylindrical or conical shape. A knurled or textured surface may be disposed on an exterior surface of the knob to facilitate fingertip rotational adjustment by the user.

The control device (e.g. control device 606) is responsive to movement of the control knob relative to the housing to facilitate control of a least one electronic function of the portable device by a user. In some embodiments it may be convenient to avoid the necessity of using the control knob to mechanically rotate portions of the control device. Accordingly, in such scenarios a non-contact type sensing arrangement can be used to allow control device 606 to detect rotation of the control knob. A suitable sensed element 616 can be provided within the control knob 304. For example, the sensed element 616 can be disposed in an outer coaxial wall 638 of the control knob. A sensor 618 can be provided within the control device to detect when the sensed element is moved or rotated. A magnetic, capacitive, inductive or optical sensing method can be used in such scenarios. In the example shown, the sensed element is a magnet and the sensor 618 is a Hall effect sensor. Accordingly, the control device 606 receives information from sensor 618 which indicates movement of the sensed element 616. Sensors of this type are well known and therefore will not be described here in detail.

An axial member 612 is provided. The axial member 612 is mounted to the housing 308 whereby the control knob can rotate about an axis 614 aligned with the axial member. The axial member advantageously has an elongated length which extends along axis 614, and a generally cylindrical profile to facilitate rotation of the control knob. The axial member 612 shown has an elongated length which allows it to extend through the top panel 318.

The antenna 608 is provided within the rotatable knob, and it is therefore advantageous to provide a low loss RF coupling for communicating RF signals from the antenna to one or more radio circuits disposed within the housing 308. Any suitable method can be used to implement the low-loss RF coupling from the rotatable control knob to the radio circuits. For example, a capacitive type RF coupling could be used for this purpose. Slip rings are well known in the art for purposes of facilitating communications of signals from a fixed circuit assembly to a rotating portion of a radio assembly. Accordingly, slip rings could also be used to facilitate such RF coupling in the present invention. However, it can be advantageous to the combine rotational support functions of axial member 612 with the RF coupling function. To this end, the axial member 612 can be comprised of an RF type coaxial connector. For example, the axial member can be comprised of a male (jack) or female (plug) type coaxial connector. In the embodiment which is illustrated in FIG. 6, axial member 612 is shown to be comprised of a jack 624, which is a male type RF coaxial connector. A corresponding mating plug 626, which is a female type RF coaxial connector, is disposed within the control knob 304 as shown. Still, the invention is not limited in this regard and sex of the two RF coaxial connectors can optionally be reversed.

RF coaxial connectors are readily available and relatively inexpensive. Moreover, use of a standard coaxial connector for the purpose of coupling the antenna to the radio circuits can facilitate ease of assembly and disassembly of the portable communication device while providing excellent RF performance. Certain types of RF coaxial connectors are designed so that the jack and plug are secured together by simply applying an axial force along the axial length of the connector pair. Suitable spring or latching structure holds the jack and plug components of the connector pair together after they are axially engaged. For example, the well-known SMB style connector has this configuration. For applications such as the present one involving a rotating control knob, axially engaging coaxial connector pairs are advantageous as compared to those where the jack and plug portion are threaded together. Accordingly, in the exemplary embodiment illustrated in FIG. 6, the axial member 612 is shown as an SMB type RF coaxial connector jack. Of course, the invention is not limited in this regard and other types of RF coaxial connectors can also be used for this purpose.

Referring once again to FIG. 6, it can be observed that the axial member 612 include a mounting portion 620 configured to transition through an aperture defined in top panel 318 of the portable electronic device. A shoulder 622 is formed on a portion of the axial member. The shoulder 622 extends radially away from the axis 614 to form an abutting wall which engages internal side 604 of top panel 318. The axial member thus extends through the housing wall defined by top panel 318. The axial member is secured in this position by suitable means. For example, a retention nut 628 can be provided which engages the axial member and holds the shoulder firmly to the internal side 604 of top panel 318. The nut has a toroidal shape which includes an inner bore. The inner bore has an inner diameter which can be sized to firmly engage the exterior of the axial member 612 as shown. A tab or catch 630 is disposed on a side wall of the axial member 612 to engage the inner bore of the nut when the nut is urged toward the shoulder 622. Alternatively, the nut 628 could be threaded onto the axial member or secured by other suitable means. The nut 628 has a cylindrical outer surface that includes a snap feature 632. The snap feature 632 in the embodiment shown is comprised of a circumferential nub which extends around the periphery of the nut.

Control knob 304 includes an internal structure which is advantageously arranged to facilitate securing of the control knob to the nut 628. For example, in the embodiment shown in FIG. 6 the control knob 304 has at its base end (adjacent to top panel 318) an inner coaxial wall 634. The inner coaxial wall has a generally cylindrical profile which is sized and shaped so as to fit snugly around the outer periphery of the nut 628. Accordingly, a central axis defined by the inner coaxial wall will be aligned with axis 614 when the control knob is disposed on the nut. The inner coaxial wall can be a continuous wall extending around the central axis 614, but can also be discontinuous so as to comprise a plurality of wall sections with axially aligned gaps disposed between two or more wall sections. A concentric gap can be provided between the inner coaxial wall 634 and the outer coaxial wall 638 to facilitate radially outward flexing of the inner coaxial wall as hereinafter described.

The inner coaxial wall 634 includes a concentric recess which defines a snap feature 636. The concentric recess is sized and shaped to receive the circumferential nub which is defined by snap feature 632. A thickness of the inner coaxial wall 634 is advantageously selected so that the inner coaxial wall will flex in a direction which is radially outward with respect to axis 614 when the control knob is pushed down over the snap feature 632. This flexing action will allow the inner coaxial wall to slide over the snap feature 632 until snap feature 632 is aligned with snap feature 636. When such alignment occurs, the inner coaxial wall will cause snap feature 636 to snappingly engage with the snap feature 632. Once engaged in this way, the snap features 632 and 636 will serve at least two functions. The snap features will function as bearing surfaces upon which the control knob 304 will rotate when a torsional force is applied to the knob. To this end, it is advantageous to form the snap features of low friction material so that the control knob can rotate smoothly on the nut. The snap features will also function as retention elements to secure the two mating parts comprising the RF coaxial connector pair. More particularly, the snap features 632, 636 will provide a detent-like engagement which will prevent jack 624 from disengaging with plug 626.

Plug 626 is fixed within the control knob 304 so that the plug rotates with the control knob and the antenna 608. Accordingly, when the control knob is rotated on the bearing surfaces defined by snap features 632, 636 the plug 626 will rotate on the cylindrical outer surface of jack 624. Consequently, a convenient and low-loss RF coupling is continuously provided between antenna 608 and a radio communication circuit disposed within the housing 308. With the arrangement as shown and described herein with respect to FIG. 6, this RF coupling is provided while also facilitating conventional control knob operations by using control device 606.

Figure 8:
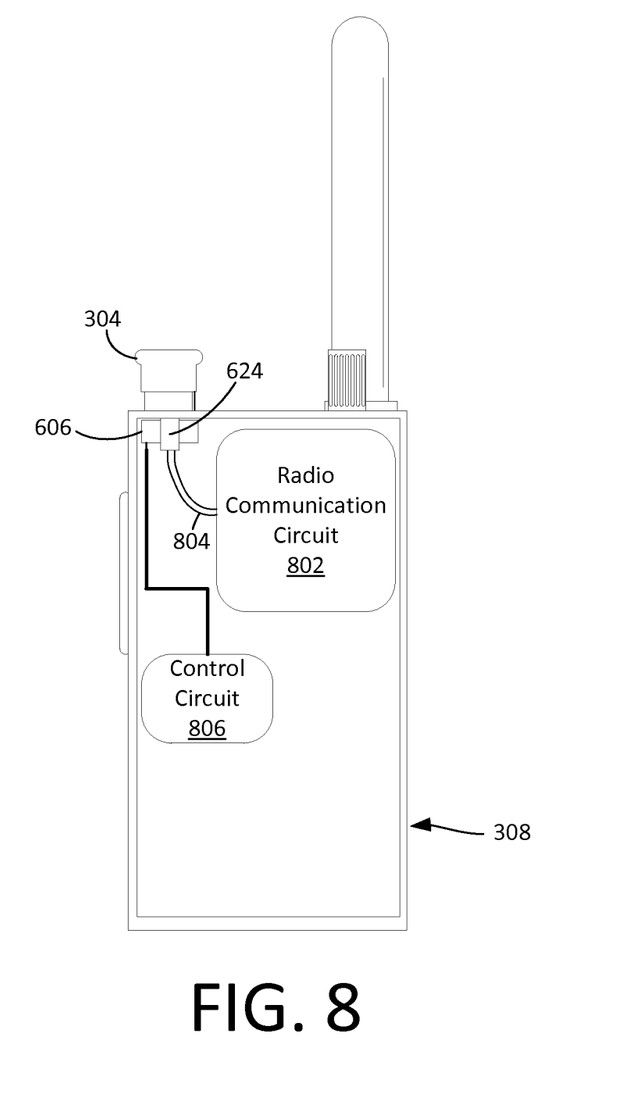
FIG. 8 is a conceptual diagram which is useful for understanding how an antenna within a control knob can be electrically coupled to one or more circuits within a portable communication device.

As shown in FIG. 6, the control device 606 can be provided with an internal bore 640 aligned with axis 614 so that the RF coaxial connector (axial member 612) may be allowed to extend through the control device. Alternatively, the control device can be disposed adjacent to the axial member 612 but laterally offset from axis 614. In this way, the control device 606 can be situated to detect movement of the sensed element 616, while still avoiding interference with the RF coaxial connector (axial member 612). As shown in FIG. 8, suitable electrical connections can be provided between the control device 606 and a control circuit 806. Accordingly, control signals derived from sensed rotation of the control knob 304 can be communicated to control circuitry within the portable communication device. The control circuitry can comprise a microprocessor, micro-controller or other type of control circuitry as would be known in the art.

The RF coaxial connector (e.g. plug 626) that is disposed within the control knob 304 is electrically coupled to the antenna 608 so that RF signals received in the antenna are coupled to the RF coaxial connector. When the control knob 304 is rotatably mounted on nut 628 as described, RF signals can be communicated with low loss to the coaxial RF connector mounted on top panel 318 (e.g. jack 624). RF signals can also be communicated in the opposite direction from jack 624 to plug 626. As shown in FIG. 8, the RF coaxial connector that is mounted to the housing (e.g. jack 624 in the embodiment shown) is electrically connected to a radio communication circuit 802 that is disposed within the housing 308. The connection to the radio communication circuit can be effectuated by any suitable means. For example, a suitable RF transmission line such as an RF coaxial cable 804 or microstrip type transmission line can be used for this purpose. If a coaxial cable is used, the cable is connected at one end to a cable receptacle 642 associated with jack 624 and to radio communication circuit 802 at an opposing end. The radio communication circuit 802 can be disposed on a printed wiring board as is known in the art. Still, the invention is not limited to the foregoing arrangement and the jack 624 could optionally be configured instead to directly connect to the radio communication circuit. In such a scenario, the coaxial cable 804 can be omitted.

Figure 7:
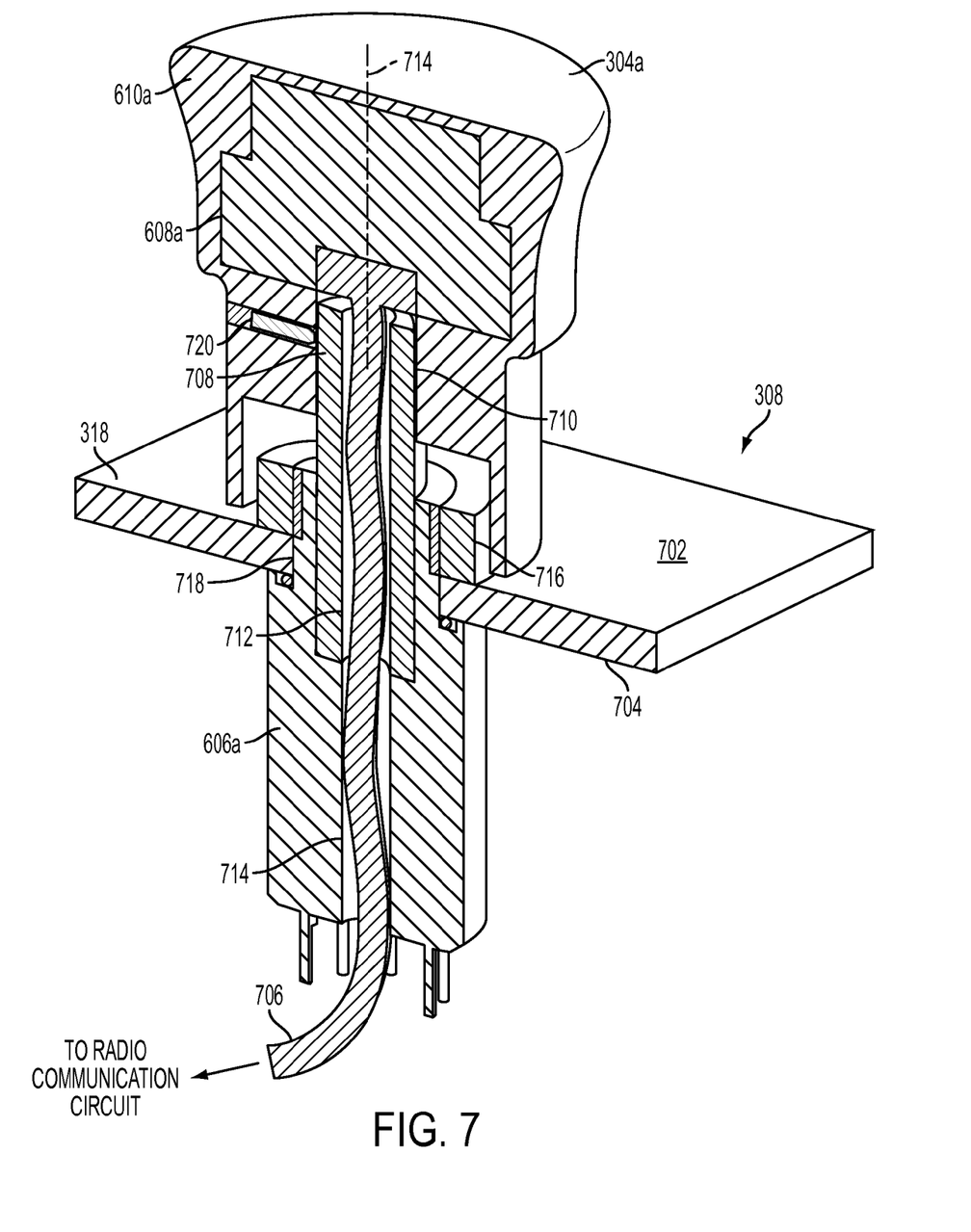
FIG. 7 is a perspective view of an alternative embodiment of the control in FIG. 5, cut-away along line 6-6 to show the internal components of the control knob and the antenna.

Referring now to FIG. 7 there is shown an alternative embodiment of the present invention in which the use of coaxial connectors is avoided. In the arrangement shown, a control knob 304a is comprised of an outer shell 610a and an antenna 608a. The control knob 304a, outer shell 610a and the antenna 608a are similar to corresponding elements 304, 608 and 610 with certain differences as described below. A control device 606a has a control shaft 708 which is rotatably mounted within the control device 606a. The control knob 304a is secured to the control shaft 708 to facilitate rotation of the control knob 304a. For example, a set screw 720 which engages the control shaft can be used to secure the control knob on the control shaft. With the control knob secured in this way, a user can apply a torque to the control knob 304a which causes the control knob, antenna and the control shaft to all rotate together.

The control device 606a can be any type of device that is capable of switching, generating or varying signals that are used to control an operational feature of a portable communication device in response to rotation of the control shaft 708. In the embodiment shown in FIG. 7, the control device 606a is located internal of the housing 308. The control device is mounted to the housing 308 by means of a suitable retention device 716. The retention device can be any suitable component capable of retaining the control device 606a in a fixed position within a bore 718 which transitions between an interior side 704 and an exterior side 702 of top panel 318. In an alternative embodiment, the retention device 716 can be provided on the interior side 704 of the housing 308.

The control shaft is comprised of an elongated cylindrical structure which is aligned with a control knob axis 714. A portion 710 of the control shaft 708 extends outside the axial length of the control device 606a. The control shaft 708 will also extend partially or fully along the axial length of control device 606a. The control shaft includes a hollow bore 712 which extends along its axial length as shown. If the control shaft 708 extends less than the entire length of the control device 606a, then the control device will include a hollow bore 714 which is axially aligned with the hollow bore 712.

A transmission line in the form of a coaxial cable 706 is used communicate RF energy between the antenna 608a and a radio circuit (e.g. radio communication circuit 802). The antenna 608a is fixed within the control knob 304a so that the antenna rotates as the control knob is rotated. In order to facilitate rotation of the control knob, the coaxial cable 706 is free to rotate within the confines of the hollow bores 712, 714. To prevent damage to the coaxial cable 706 the rotational range of the control knob is limited. For example, the rotational range of control knob 304 can be limited by mechanical stops (not shown) which are provided within the control device 606a.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A portable communication device, comprising:
   a housing;
   at least one radio frequency communication circuit disposed in the housing, the radio frequency communication circuit selected from a group consisting of a radio receiver circuit, a radio transmitter circuit, and a radio transceiver circuit;
   a control knob provided external of the housing;
   at least one control device responsive to movement of the control knob relative to the housing, and facilitating control of a least one function of the portable device by a user;
   an antenna for the radio frequency communication circuit fixed within a volume defined by the control knob, wherein the antenna moves with the control knob when the control knob is moved relative to the housing;
   an axial member fixed to the housing and about which the control knob can rotate; and
   a nut securing the axial member and the control knob to each other and comprising a bearing surface upon which the control knob can rotate when a torsional force is applied to the control knob.

2. The portable communication device according to claim 1, wherein the control knob is a molded part formed of a dielectric material, and the antenna is potted within the dielectric material.

3. The portable communication device according to claim 1, wherein a sensed element is disposed in the control knob, and the control device comprises a sensor which is arranged to detect movement of the control knob relative to the housing based on a position of the sensed element.

4. The portable communication device according to claim 3, wherein the sensed element is a magnet and the sensor is a Hall effect sensor.

5. The portable communication device according to claim 3, wherein
the sensor is internal of the housing,
the control knob and sensed element are external of the housing, and
the sensed element and the sensor are separated by at least one wall defining a portion of the housing.

6. The portable communication device according to claim 1, further comprising an axial member fixed to the housing, and wherein the control knob is journaled on the axial member, whereby the control knob can rotate about an axis aligned with the axial member.

7. The portable communication device according to claim 6, wherein the axial member is comprised of an RF coaxial connector.

8. The portable communication device according to claim 7, wherein the RF coaxial connector is an SMB type connector.

9. A portable communication device, comprising:
a housing;
at least one radio frequency communication circuit disposed in the housing, the radio frequency communication circuit selected from a group consisting of a radio receiver circuit, a radio transmitter circuit, and a radio transceiver circuit;
a control knob provided external of the housing;
at least one control device responsive to movement of the control knob relative to the housing, and facilitating control of a least one function of the portable device by a user;
an antenna for the radio frequency communication circuit fixed within a volume defined by the control knob, wherein the antenna moves with the control knob when the control knob is moved relative to the housing;
an axial member fixed to the housing;
wherein the control knob is journaled on the axial member, whereby the control knob can rotate about an axis aligned with the axial member;
wherein the axial member is comprised of an RF coaxial connector;
wherein the RF coaxial connector extends through a wall of the housing, and is secured in place by a nut which is secured on the RF coaxial connector, the control knob further comprising at least one snap feature which is arranged to engage with a corresponding snap feature disposed on the nut.

10. The portable communication device according to claim 7, further comprising a second RF coaxial connector fixed within the control knob and configured to mate with a portion of the axial member.

11. The portable communication device according to claim 10, wherein the second RF coaxial connector is an SMB type connector.

12. The portable communication device according to claim 6, wherein the control knob contains at least one slip ring contact configured to facilitate communication of RF energy between the antenna and the radio frequency communication circuit, while also facilitating rotation of the control knob.

13. The portable communication device according to claim 1, further comprising an RF coaxial connector disposed within the control knob and electrically coupled to the antenna, the RF coaxial connector configured to mate with a oppositely-sexed RF coaxial connector disposed on the housing.

14. The portable communication device according to claim 13, wherein the RF coaxial connector is an SMB type connector.

15. The portable communication device according to claim 1, wherein the at least one control device is comprised of a control shaft to which the control knob is affixed, the control shaft rotatable about a central axis responsive to rotation of the control knob by a user, and having an internal bore aligned with the central axis.

16. The portable communication device according to 15, further comprising a coaxial cable disposed within the bore and arranged to couple RF energy between the antenna and the radio frequency communication circuit.

17. The portable communication device according to claim 15, wherein the at least a sensor portion of the control device is disposed internal of the housing.

18. A control for a portable communication device, comprising:
an outer shell at least partially formed of a dielectric material and defining a knob which is ergonomically sized and shaped to facilitate fingertip control of a portable communication device;
an antenna disposed within the outer shell;
an axial member on which the ergonomic outer shell and the antenna are mounted to facilitate rotation of the control knob;
a control device configured to control at least one electronic circuit of a portable communication device responsive to a user rotation of the outer shell and the antenna; and
a nut securing the axial member and the knob to each other and comprising a bearing surface upon which the knob can rotate when a torsional force is applied to the knob.

19. The control according to claim 18, wherein the axial member is an RF coaxial connector.

20. The control according to claim 18, further comprising at least one sensed element disposed within said outer shell configured to interact with a sensor disposed in said control device.

21. A control for a portable communication device, comprising:
an outer shell at least partially formed of a dielectric material and defining a knob which is ergonomically sized and shaped to facilitate fingertip control of a portable communication device;
an antenna disposed within the outer shell;
an axial member on which the ergonomic outer shell and the antenna are mounted to facilitate rotation of the control knob;
a control device configured to control at least one electronic circuit of a portable communication device responsive to a user rotation of the outer shell and the antenna;
a mounting portion provided on the axial member aligned with an axis of rotation of the outer shell, the mounting portion configured to transition through a housing wall of a portable communication device;
a retention nut which secures said mounting portion of said axial member to said housing; and
a bearing surface defined on said retention nut, wherein said outer shell is configured to rotate on said bearing surface.

22. The control according to claim 18, wherein said axial member is part of said control device and wherein said control device is responsive to said rotation of said axial member for implementing at least one control function.

23. The control according to claim 22, wherein said axial member is a control shaft having a central bore extending along an axial length thereof, and further comprising an RF transmission line extending along a length of said bore and connected to said antenna.

\* \* \* \* \*